United States Patent
Guo

(10) Patent No.: US 9,342,442 B2
(45) Date of Patent: May 17, 2016

(54) METHOD OF READING AND INPUTTING DATA FOR TESTING SYSTEM AND TESTING SYSTEM THEREOF

(71) Applicant: Wistron Corporation, New Taipei (TW)

(72) Inventor: Janhong Guo, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 243 days.

(21) Appl. No.: 13/895,342

(22) Filed: May 15, 2013

(65) Prior Publication Data

US 2014/0068151 A1 Mar. 6, 2014

(30) Foreign Application Priority Data

Sep. 5, 2012 (CN) .......................... 2012 1 0325977

(51) Int. Cl.
*G06K 19/00* (2006.01)
*G06F 12/00* (2006.01)
*H04B 17/00* (2015.01)

(52) U.S. Cl.
CPC ............ *G06F 12/00* (2013.01); *H04B 17/0085* (2013.01)

(58) Field of Classification Search
USPC .................................. 235/435, 439, 454, 462
See application file for complete search history.

(56) References Cited

U.S. PATENT DOCUMENTS

| 2006/0252375 | A1 | 11/2006 | Wu |
| 2008/0061145 | A1* | 3/2008 | McGushion ............. 235/462.13 |
| 2008/0307199 | A1 | 12/2008 | Tseng |
| 2008/0307200 | A1 | 12/2008 | Tseng |
| 2011/0101085 | A1* | 5/2011 | Nakagawa ..................... 235/375 |
| 2012/0091206 | A1* | 4/2012 | Goren .......................... 235/470 |

FOREIGN PATENT DOCUMENTS

| TW | 572266 | 1/2004 |
| TW | 200639418 | 11/2006 |

OTHER PUBLICATIONS

Office action mailed on Jun. 3, 2014 for the Taiwan application No. 101133167, filing date: Sep. 11, 2012, p. 1 line 10-14, p. 2 and p. 3 line 1-16 and line 20-21.
Office action mailed on Oct. 1, 2014 for the Taiwan application No. 101133167, filing date: Sep. 11, 2012, p. 1 line 13-14, p. 2-4 and p. 5 line 1-23.
Office action mailed on Nov. 27, 2015 for the China application No. 201210325977.1, p. 3 line 4-28, p. 4-6 and p. 7 line 1.

* cited by examiner

*Primary Examiner* — Matthew Mikels
(74) *Attorney, Agent, or Firm* — Winston Hsu; Scott Margo

(57) ABSTRACT

A method of inputting data for a testing system is disclosed. The method includes coupling an information buffer to a device to be tested, transferring the device to be tested to a plurality of test stations in the testing system in turn, and obtaining the plurality of product identifications stored in the information buffer in each of the plurality of test stations.

19 Claims, 7 Drawing Sheets

US 9,342,442 B2

METHOD OF READING AND INPUTTING DATA FOR TESTING SYSTEM AND TESTING SYSTEM THEREOF

BACKGROUND OF THE INVENTION

1. Field of the Invention

The present disclosure relates to a method of inputting data for a test system and the test system thereof, and more particularly, to a method of inputting data for a test system and the test system thereof which is capable of reducing a number of working personnel required for inputting data, in order to save human resources.

2. Description of the Prior Art

In recent years, more companies have focused on producing electronic products. Under high competition, in addition to higher quality requirements for the products, how to reduce costs involved in product research and development has also become a challenge. How to produce high quality products in a low cost and highly efficient manner has therefore become the most important issue for many companies.

During product development, a large number of tests are required to ensure high quality and stability; hence, various test stations are utilized for performing different tests in the prior art. In order to improve test efficiency, a bar-code reader is utilized in each test station, which can read bar-codes in order to input product identification and test information of a particular device to be tested to a computing device in the test station. Each test station requires a person responsible for utilizing the bar-code reader, in order to input the serial numbers which correspond to the product identifications. FIG. 1 is a schematic diagram of a conventional test system 10. The test system 10 includes N test stations $TS_1$-$TS_N$ and a plurality of devices to be tested. Each device to be tested enters each test station in turn from left to right, to perform comparison and processing of the product identifications. Each test station among the test stations $TS_1$-$TS_N$ requires a working person responsible for utilizing the bar-code reader to read the bar-codes in order to input the serial numbers. The method of reading the bar-codes to input the serial numbers is illustrated in FIG. 2, which is a schematic diagram of a conventional manual test station $TS_A$. In FIG. 2, a working person 202 utilizes a bar-code reader 204 in order to input information of a serial number SN to a computing device 206 in the manual test station $TS_A$. The manual test station $TS_A$ further includes a connecting device 210. When a device to be tested 220 is transmitted to the manual test station $TS_A$, the connecting device 210 connects the computing device 206 and the device to be tested 220 in a contact manner. As shown in FIG. 2, each of the manual test stations $TS_A$ require one working person 202 responsible for performing the bar-code reading; hence, N manual test stations require a total of N working persons to accomplish these tasks.

As mentioned above, when a test system includes N test stations, N working persons are required for utilizing the bar-code readers to read the bar-codes. Electronic products are increasingly complex, however, such that required tests may number in the hundreds. When the number of test stations increases, the working persons responsible for performing the bar-code reading will also increase, which consumes a significant amount of human resources. Therefore, there is a need for a method which inputs serial numbers automatically in order to save human resources by reducing the number of working personnel required for inputting data.

SUMMARY OF THE INVENTION

It is therefore an objective of the present disclosure to provide a method of inputting data for a test system and the test system thereof which is capable of reducing the number of working personnel required for inputting data, in order to save human resources and improve test efficiency.

The present disclosure discloses a method of inputting data for a test system. The method comprises coupling an information buffer to a device to be tested, transmitting the device to be tested to a plurality of test stations in turn, and obtaining a plurality of product identifications stored in the information buffer in each of the plurality of test stations.

The present disclosure further discloses a test system, which comprises a device to be tested; an information buffer, coupled to the device to be tested in a pluggable manner, for storing data; and a plurality of test stations. Each of the plurality of test stations comprises a connecting device for accessing the information buffer in a contact manner when the device to be tested enters the test station; and a computing device, coupled to the connecting device, for reading a plurality of product identifications via the connecting device.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
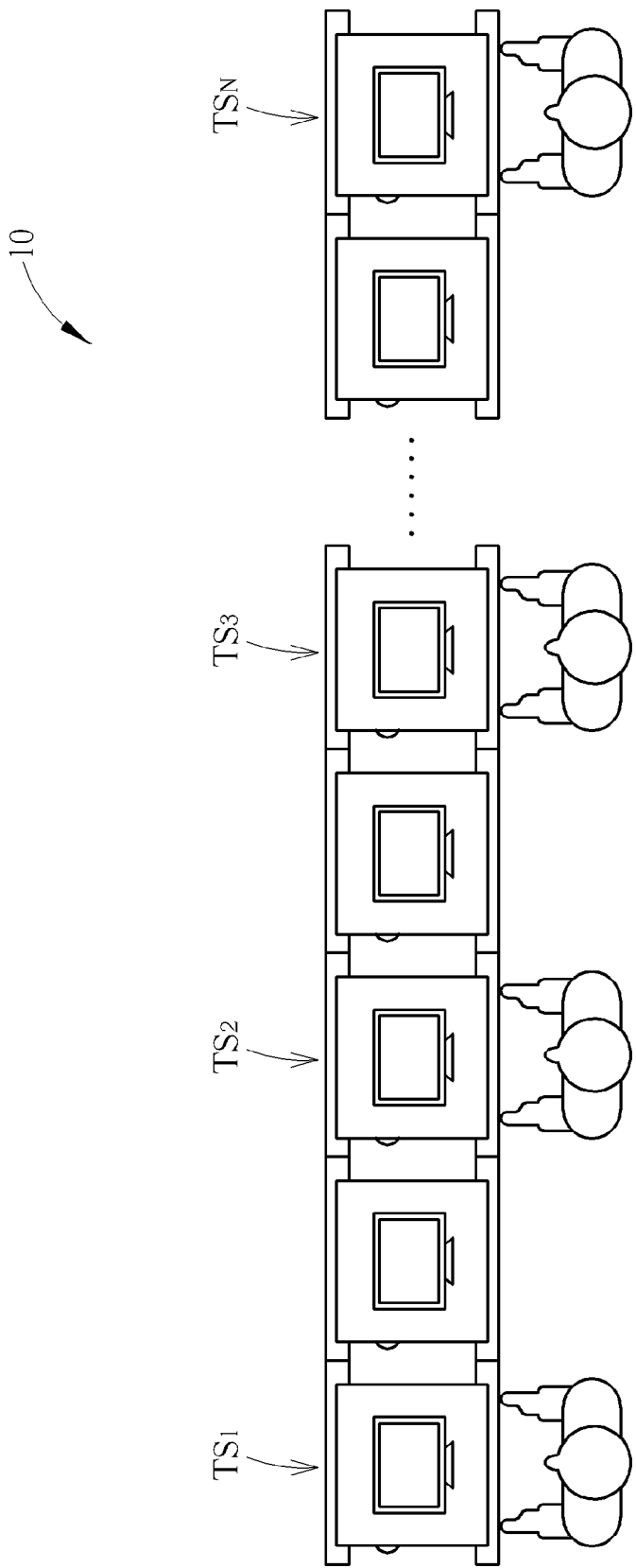
FIG. 1 is a schematic diagram of a conventional test system.
Figure 3:
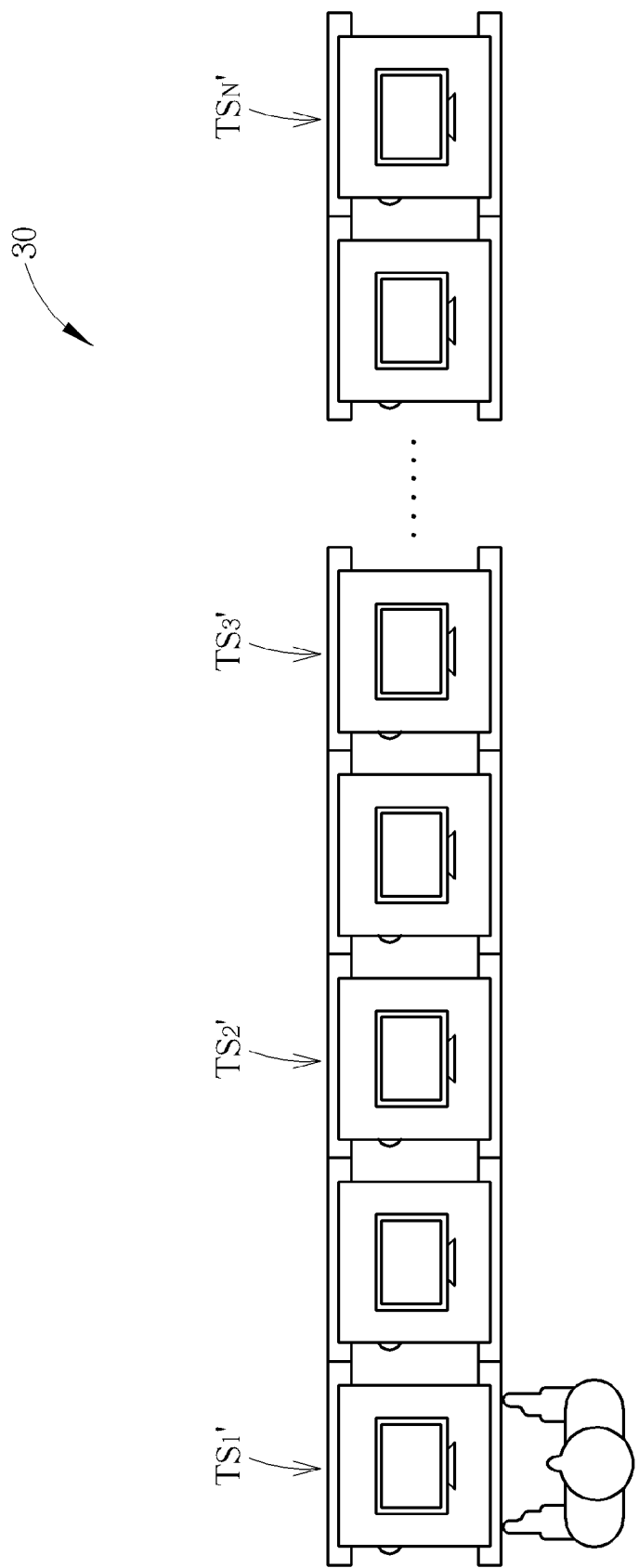
FIG. 3 is a schematic diagram of a test system according to an embodiment of the present disclosure.

Please refer to FIG. 3, which is a schematic diagram of a test system 30 according to an embodiment of the present disclosure. The test system 30 includes N test stations $TS_1'$-$TS_N'$ utilized for testing a plurality of devices. Each device to be tested enters each test station in turn from left to right to perform comparison and processing of the product identifications, where each of the product identifications corresponds to a serial number. By comparing the test system 10 in FIG. 1 and the test system 30 in FIG. 3 it can be seen that the structures of the test system 30 and the test system 10 are similar, and that the main difference is in the test system 30, where each device to be tested only performs serial number reading in the test station $TS_1'$. In other words, only one working person is required to accomplish serial number input in the test system 30, but the test system 10 requires N working persons to perform the serial number input. No matter how many test stations the test system 30 has, according to the above embodiment of the present disclosure, only the first test station will be defined as a previous test station. The following embodiments describe the previous test station as the manual test station $TS_1'$, and the other test stations of the following embodiments are described as automatic test stations $TS_2'$-$TS_N'$. The serial numbers are only required to be inputted by a working person in the manual test station $TS_1'$, and the automatic test stations $TS_2'$-$TS_N'$ may not require any working persons. Therefore, in the whole test system, only one working person is required to accomplish the serial number input.

Figure 4:
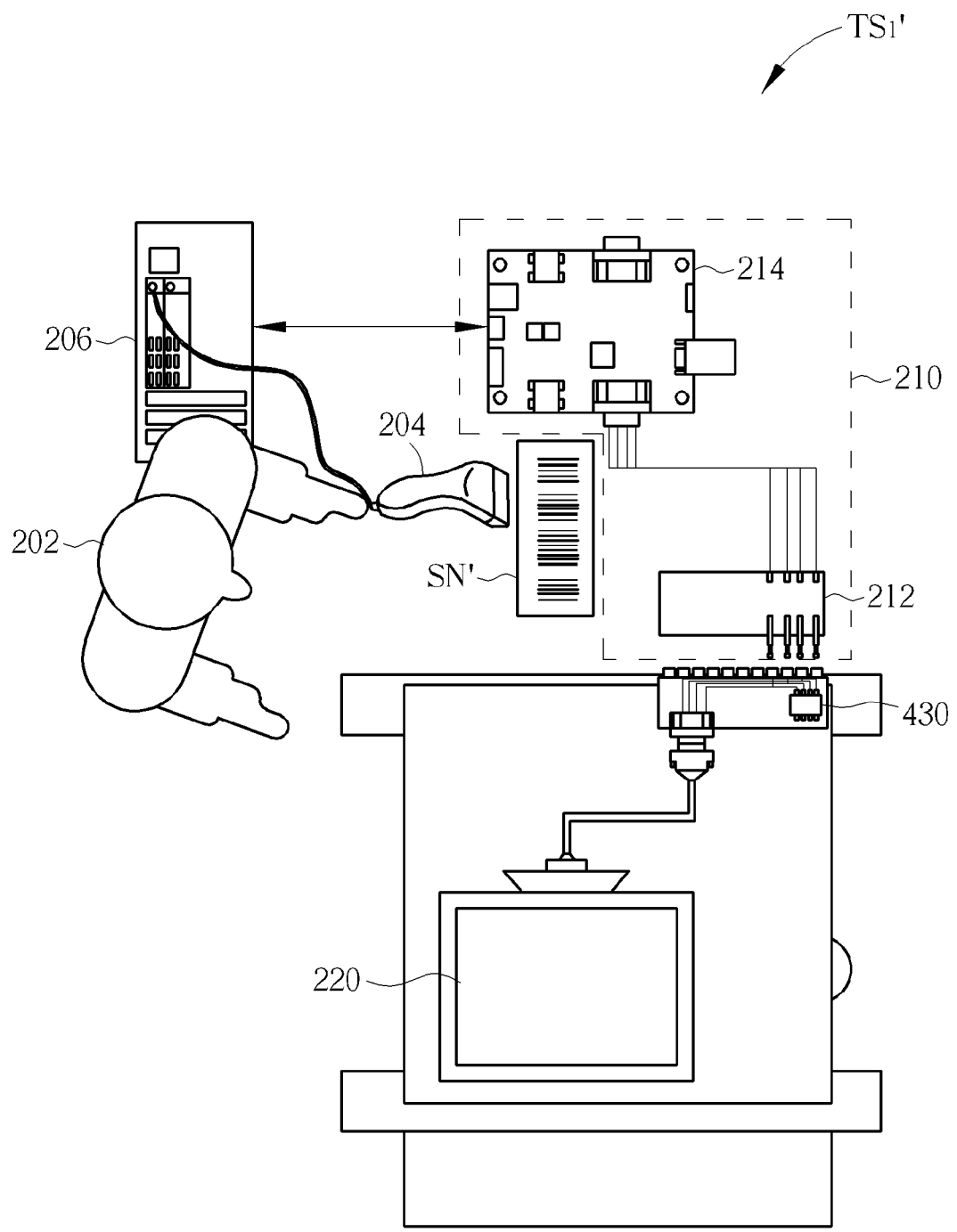
FIG. 4 is a schematic diagram of a manual test station according to an embodiment of the present disclosure.
Figure 5:
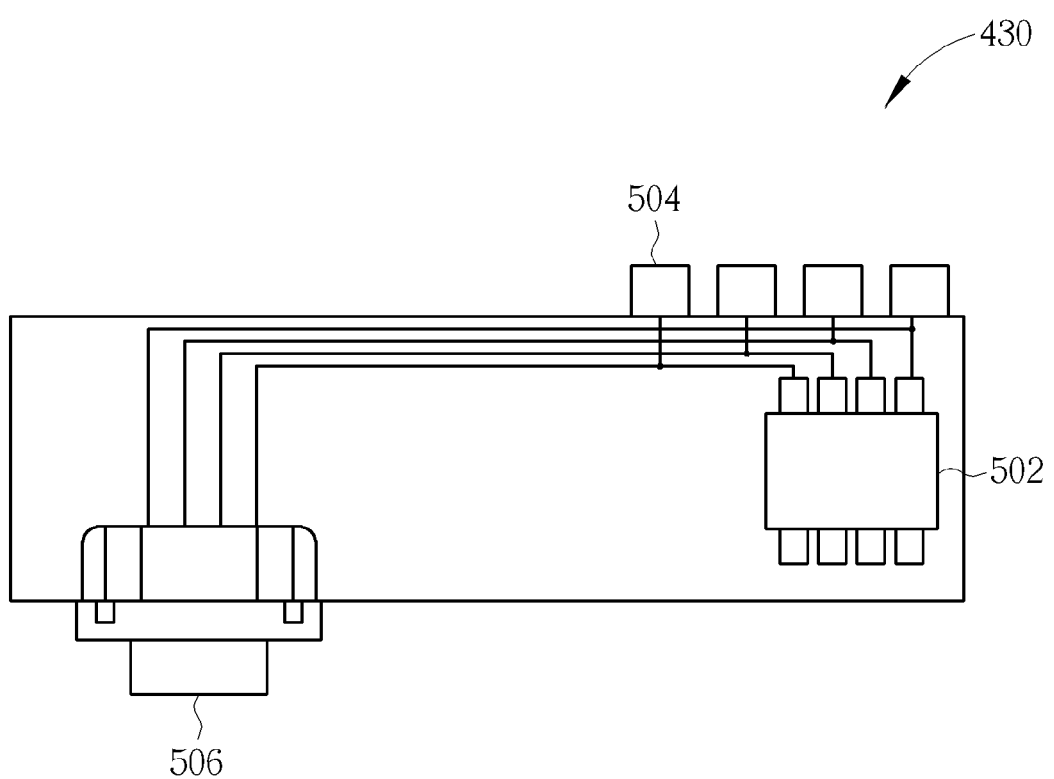
FIG. 5 is a schematic diagram of an information buffer according to an embodiment of the present disclosure.

An implementation of the manual test station $TS_1'$ is illustrated in FIG. 4. As shown in FIG. 4, the structure of the manual test station $TS_1'$ is similar to the manual test station $TS_A$ in FIG. 2; hence, elements with similar functions are denoted by the same symbols. The difference between the manual test station $TS_1'$ and the manual test station $TS_A$ is that the manual test station $TS_1'$ further includes an information buffer 430. In order to show that the serial number information read by the manual test station $TS_1'$ is different from the serial number SN read by the manual test station $TS_A$, the serial number in the manual test station $TS_1'$ will be denoted by SN' hereinafter. The information buffer 430, coupled to the device to be tested 220 in a pluggable manner, is utilized for storing data. A structure of the information buffer 430 is illustrated in FIG. 5. The information buffer 430 includes a memory 502, at least one contact node 504, and a transmitting interface 506. The memory 502 is utilized for storing the serial number SN' read in the manual test station $TS_1'$. The memory 502 can be an electrically erasable programmable read only memory (EEPROM) or other memories capable of reading and writing data rapidly, which are not limited herein. The contact node 504, coupled to the memory 502, is utilized for accessing the connecting device 210 in a contact manner. The transmitting interface 506, coupled to the device to be tested 220 and the contact node 504, is utilized for outputting information of the device to be tested 220 via the contact node 504.

In the manual test station $TS_1'$, a working person 202 utilizes a bar-code reader 204 to read bar-codes, in order to input information of the serial number SN' to a computing device 206 in the test station $TS_1'$. The manual test station $TS_1'$ also includes a connecting device 210 for accessing the computing device 206 in a contact manner. In detail, the connecting device 210 of the manual test station $TS_1'$ may include a connecting fixture 212 and a converting module 214. The connecting fixture 212 is utilized for accessing the information buffer 430 in a contact manner. When the device to be tested 220 is transmitted to the manual test station $TS_1'$, the connecting fixture 212 may contact the information buffer 430; hence, information will be transmitted between the connecting fixture 212 and the information buffer 430. In the same way, when any devices are transmitted to the manual test station $TS_1'$, the information buffer connected to the device can be accessed by the connecting fixture 212, in order to transmit the serial number information. The converting module 214, coupled between the computing device 206 and the connecting fixture 212, is utilized for converting or switching signals between different transmitting interfaces. The common transmitting interfaces of the computing devices include a universal serial bus (USB), and the common transmitting interfaces of the connecting fixtures include an inter-integrated circuit ($I^2C$). In such a situation, the converting module 214 can be a hardware structure utilized for converting between a USB and an $I^2C$. As a result, the serial number SN' read by the bar-code reader 204 is first transmitted to the computing device 206, then transmitted to the connecting fixture 212 via the converting module 214. The connecting fixture 212 then accesses the information buffer 430 to store information of the serial number SN' in the memory 502 in the information buffer 430.

Figure 6:
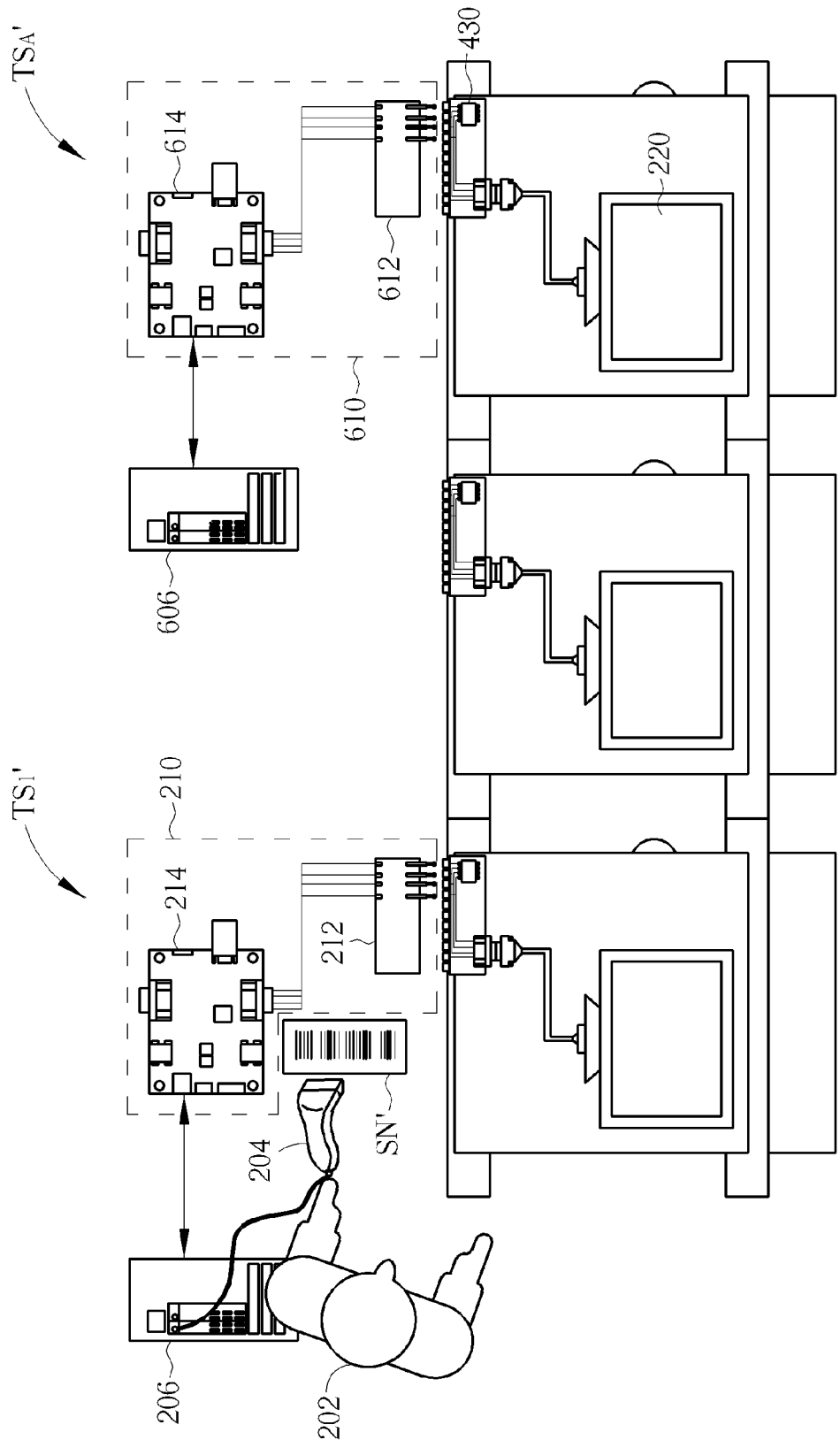
FIG. 6 is a schematic diagram of a manual test station and an automatic test station according to an embodiment of the present disclosure.

After the above process is accomplished, the device to be tested 220 and the corresponding information buffer 430 may be transmitted together to an automatic test station $TS_A'$. Please refer to FIG. 6, which is a schematic diagram of a manual test station $TS_1'$ and an automatic test station $TS_A'$ according to an embodiment of the present disclosure. The structures of the automatic test station $TS_A'$ and the manual test station $TS_1'$ are similar, and will not be narrated herein. The main difference between the manual test station $TS_1'$ and the automatic test station $TS_A'$ is that in the automatic test station $TS_A'$, no bar-code readers and working persons for utilizing the bar-code readers are included. Since the information of the serial number SN' has been stored in the information buffer 430 and transmitted to the automatic test station $TS_A'$ together with the device to be tested 220, no bar-code readings are required in the automatic test station $TS_A'$. Therefore, no working persons are required for utilizing the bar-code readers, which can reduce the number of working personnel required for inputting data, so as to save human resources.

Please note that in the automatic test station $TS_A'$, the information of the serial number SN' still has to be transmitted to a computing device 606. As mentioned above, the structures of the automatic test station $TS_A'$ and the manual test station $TS_1'$ are similar; hence, the automatic test station $TS_A'$ may also include a connecting device 610. Similarly, the connecting device 610 may also include a connecting fixture 612 and a converting module 614, whose functions are the same as the connecting fixture 212 and the converting module 214 in the manual test station $TS_1'$, and will therefore not be detailed herein. When the device to be tested 220 and the corresponding information buffer 430 are transmitted together to the automatic test station $TS_A'$, the connecting fixture 612 in the automatic test station $TS_A'$ may contact the contact node 504 in the information buffer 430; hence, information of the serial number SN' can be read from the memory 502, transmitted to the connecting fixture 612 via the contact node 504, and then converted between different interfaces via the converting module 614, in order to transmit the serial number SN' to the computing device 606.

Figure 2:
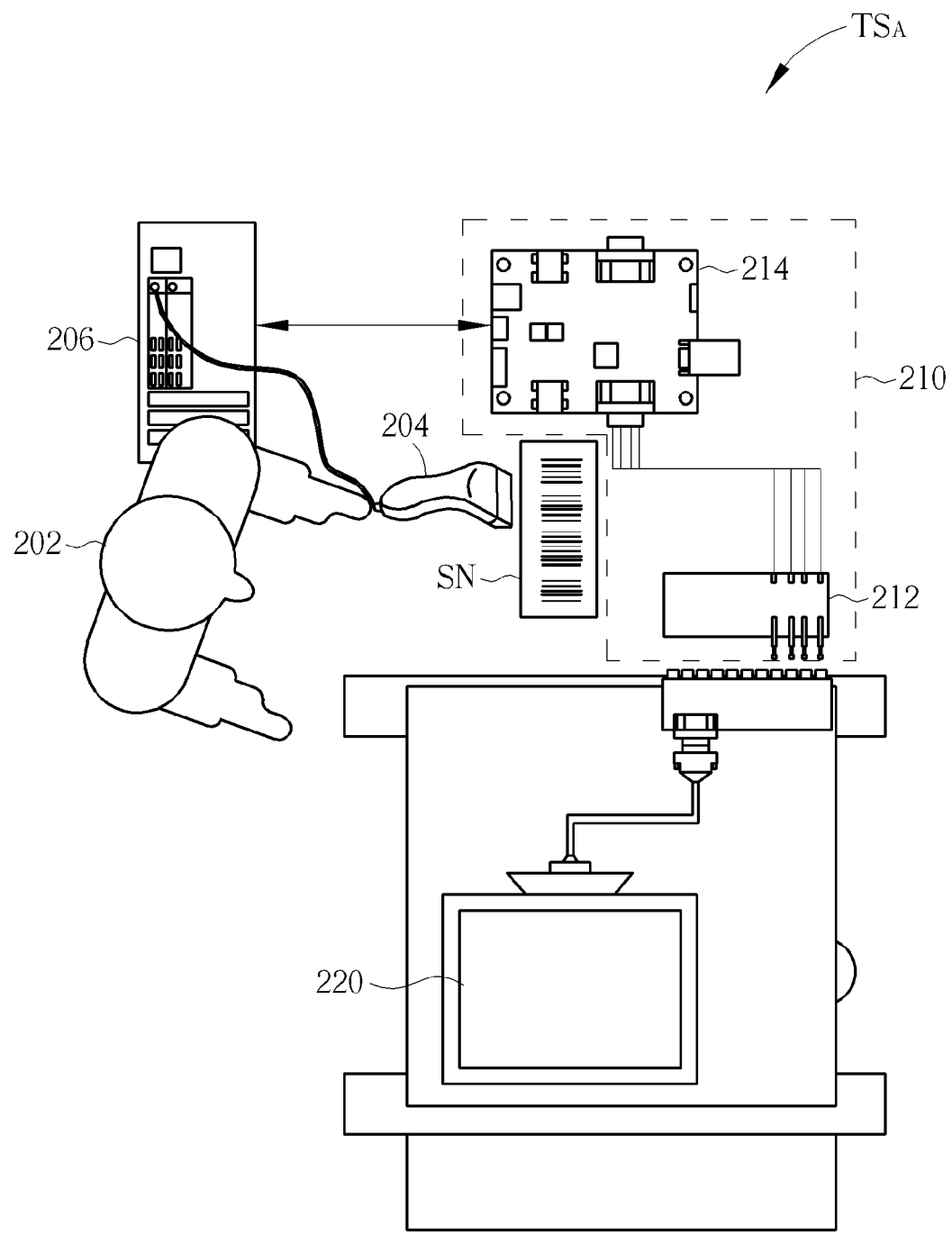
FIG. 2 is a schematic diagram of a conventional manual test station.

Please note that the serial number SN' in FIG. 4 and the serial number SN in FIG. 2 are different. In FIG. 2, the serial number SN only corresponds to test information of the device to be tested 220 in the manual test station $TS_A$; hence, in each of the manual test station $TS_A$, bar-code readings should be performed to receive the information corresponding to the device to be tested 220 in the test station $TS_A$. In such a situation, each test station requires a working person responsible for utilizing a bar-code reader to read bar-codes. In comparison, in FIG. 4, a working person performs bar-code reading in the manual test station $TS_1'$ to obtain the serial number SN' and store the serial number SN' in the information buffer 430. Since the serial number SN' may be stored in the information buffer 430 corresponding to the device to be tested 220 and transmitted to each of the following automatic test stations $TS_2'$-$TS_N'$ with the device to be tested 220, the serial number SN' not only includes the test information corresponding to the device to be tested 220 in the manual test station $TS_1'$, but also includes the required test information corresponding to the device to be tested 220 in the other automatic test stations $TS_2'$-$TS_N'$. As a result, when the device to be tested 220 and the corresponding information buffer 430 are transmitted together to each of the automatic test stations $TS_2'$-$TS_N'$, the contact node 504 in the information buffer 430 maybe utilized for contacting the connecting fixtures in the automatic test stations $TS_2'$-$TS_N'$, in order to transmit the serial number information to the computing devices in the automatic test stations $TS_2'$-$TS_N'$ to perform the following data processing. The number of working personnel required for inputting data will therefore be reduced, which saves human resources.

One of the aims of the present disclosure is to reduce the number of working personnel required for inputting data, for saving human resources. Those skilled in the art can make modifications or alterations accordingly. For example, in the manual test station $TS_1'$, the method of utilizing the bar-code reader to read the serial number is only one of the embodiments for inputting data. Other methods can also be utilized; for example, utilizing a keyboard, a mouse, or a touchscreen, etc. to input data to the computing device, which are not limited herein. According to the above embodiment of the present disclosure, the test station $TS_1'$ is defined as a manual test station in the test system 30, and the other test stations are all defined as automatic test stations. In other embodiments, if the quantity of the data required to be inputted is large, two, or more than three manual test stations may also be utilized, wherein the number is not limited herein.

The implementation of the converting modules 214, 614 may not be limited to the hardware structures for conversion between USB and $I^2C$, and can also be other modules provided for conversion between any communication interfaces. Or, a connecting fixture may connect to a computing device directly, and the functions of converting modules are realized in the computing device. In addition, the test system 30 illustrated in FIG. 3 is only one embodiment, and those skilled in the art can adjust the number and structures of the test stations in the test system 30 according to the test processes required to be performed for various devices, which are not limited herein. For example, when the device to be tested 220 is a liquid crystal display (LCD), the transmitting interface 506 connected between the device to be tested 220 and the contact node 504 may be a video graphics array (VGA) interface; when the device to be tested 220 is a computer, the transmitting interface 506 may be a USB interface; these modifications are not limited herein.

Figure 7:
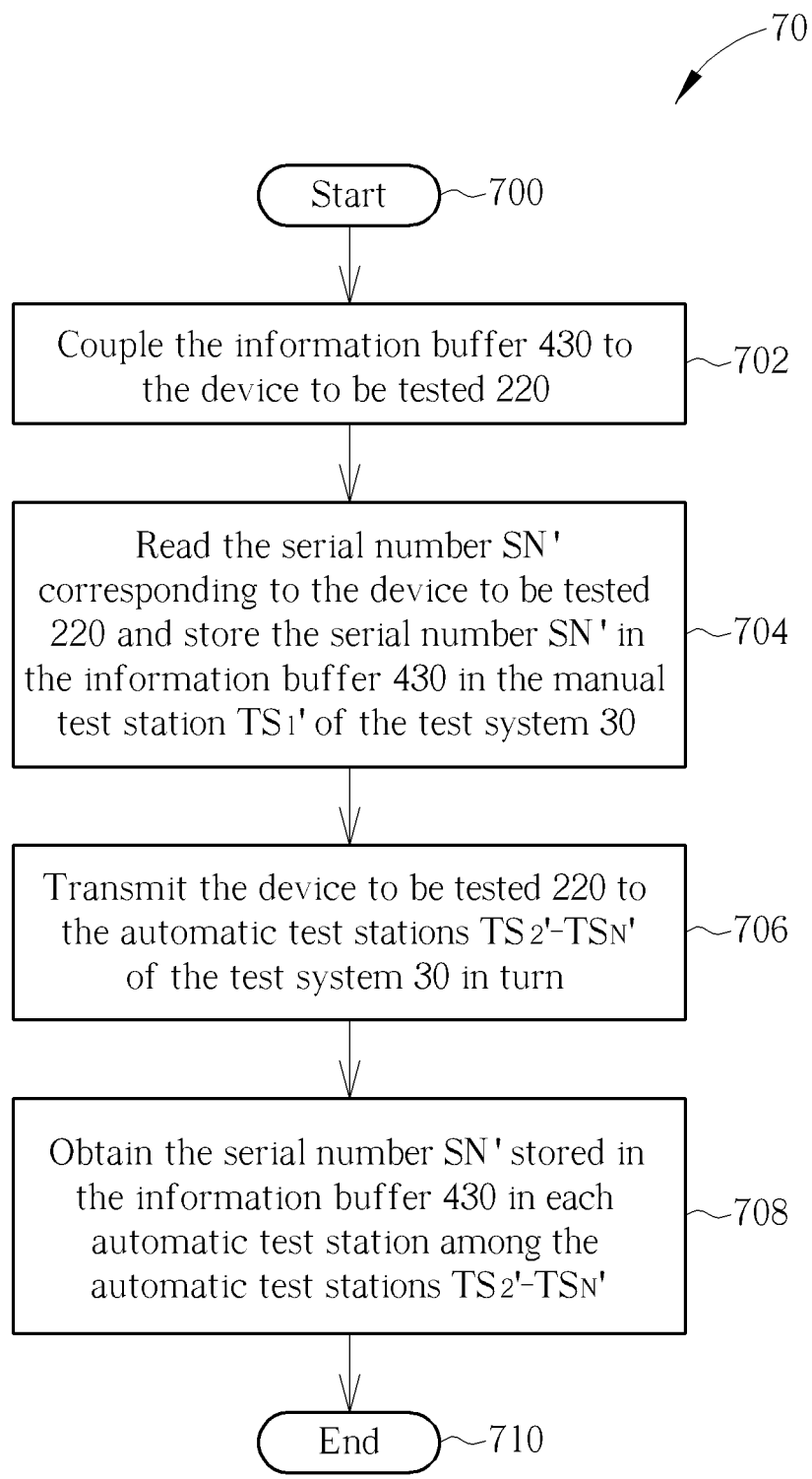
FIG. 7 is a schematic diagram of a serial number input process according to an embodiment of the present disclosure.

The above operations of the test system can be summarized into a serial number input process 70. As shown in FIG. 7, the serial number input process 70 includes the following steps:

Step 700: Start.

Step 702: Couple the information buffer 430 to the device to be tested 220.

Step 704: Read the serial number SN' corresponding to the device to be tested 220 and store the serial number SN' in the information buffer 430 in the manual test station $TS_1'$ of the test system 30.

Step 706: Transmit the device to be tested 220 to the automatic test stations $TS_2'$-$TS_N'$ of the test system 30 in turn.

Step 708: Obtain the serial number SN' stored in the information buffer 430 in each automatic test station among the automatic test stations $TS_2'$-$TS_N'$.

Step 710: End.

Detailed operations of the serial number input process 70 are illustrated in the above paragraphs, and will not be repeated hereafter.

In the prior art, when a device to be tested is transmitted to a test station, a working person in the test station utilizes a bar-code reader to read bar-codes to input serial numbers; hence, each test station requires one working person. In comparison, no matter how many test stations there are in the test system of the present disclosure, only one test station needs to be defined as a manual test station, and the other test stations can be defined as automatic test stations. The serial number only needs to be inputted by a working person in the manual test station, and no working persons are required in the automatic test stations. In other words, only one working person is required to accomplish the serial number input.

The present disclosure can therefore reduce the number of working personnel required for inputting data effectively, which saves human resources and improves test efficiency.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of reading and inputting data for a test system, comprising:
   coupling an information buffer to a device to be tested;
   delivering the device to be tested to a plurality of test stations in a line; and
   obtaining a plurality of product identifications stored in the information buffer in each of the plurality of test stations.

2. The method of claim 1, further comprising:
   reading the plurality of product identifications corresponding to the device to be tested and storing the plurality of product identifications in the information buffer in a previous test station.

3. The method of claim 2, wherein the step of reading the plurality of product identifications corresponding to the device to be tested comprises utilizing an input device for reading the plurality of product identifications corresponding to the device to be tested.

4. The method of claim 3, wherein the input device is a bar-code reader.

5. The method of claim 2, wherein the step of storing the plurality of product identifications in the information buffer comprises:
   utilizing a connecting device for connecting a computing device and the information buffer;
   storing the plurality of product identifications in the computing device; and
   transmitting the plurality of product identifications from the computing device via the connecting device to the information buffer.

6. The method of claim 1, wherein the step of obtaining a plurality of product identifications stored in the information buffer in each of the plurality of test stations comprises:
   utilizing a connecting device for connecting a computing device and the information buffer in the second test station; and
   reading the plurality of product identifications stored in the information buffer by the computing device via the connecting device.

7. The method of claim 1, wherein each of the plurality of product identifications corresponds to a serial number.

8. A test system, comprising:
   a device to be tested;
   an information buffer, coupled to the device to be tested in a pluggable manner, for storing data; and
   a plurality of test stations, each comprising:
      a connecting device, for accessing the information buffer in a contact manner when the device to be tested enters the test station; and
      a computing device, coupled to the connecting device, for reading a plurality of product identifications via the connecting device;
   wherein the device to be tested is delivered to the plurality of test stations in a line.

9. The system of claim 8, further comprising:
   a previous test station, comprising:

an input device, for reading the plurality of product identifications;

a first connecting device, for accessing the information buffer in a contact manner; and a first computing device, coupled to the input device and the first connecting device, for transmitting the plurality of product identifications read by the input device to the information buffer via the first connecting device, in order to store the plurality of product identifications in the information buffer.

10. The system of claim 8, wherein the information buffer comprises:

a memory;

at least one contact node, coupled to the memory, for accessing the connecting device in a contact manner; and a transmitting interface, coupled to the device to be tested and the contact node, for outputting information of the device to be tested via the contact node.

11. The system of claim 10, wherein the memory is an electrically erasable programmable read only memory (EEPROM).

12. The system of claim 10, wherein the transmitting interface is a video graphics array (VGA) interface.

13. The system of claim 8, wherein the device to be tested is a liquid crystal display (LCD).

14. The system of claim 9, wherein the input device is a bar-code reader.

15. The system of claim 9, wherein the first connecting device comprises:

a connecting interface, for connecting the first computing device;

a connecting fixture, for accessing the information buffer in a contact manner; and a converting module, coupled between the connecting interface and the connecting fixture, for switching a signal between the connecting interface and the connecting fixture.

16. The system of claim 15, wherein the connecting interface is selected from a universal serial bus (USB) or an inter-integrated circuit ($I^2C$).

17. The system of claim 8, wherein the connecting device comprises:

a connecting interface, for connecting the computing device;

a connecting fixture, for accessing the information buffer in a contact manner; and a converting module, coupled between the connecting interface and the connecting fixture, for switching a signal between the connecting interface and the connecting fixture.

18. The system of claim 17, wherein the connecting interface is selected from a universal serial bus (USB) or an inter-integrated circuit ($I^2C$).

19. The system of claim 8, wherein each of the plurality of product identifications corresponds to a serial number.

* * * * *